United States Patent [19]
Soshi et al.

[11] Patent Number: 5,557,357
[45] Date of Patent: Sep. 17, 1996

[54] CAMERA HAVING ANTI-VIBRATION FUNCTION WITH IMPROVED CONNECTION AND PLACEMENT OF ANTI-VIBRATION COMPONENTS

[75] Inventors: Isao Soshi, Tokyo; Hidenori Miyamoto, Urayasu; Minoru Kato; Junichi Omi, both of Kawasaki; Tatsuo Amanuma, Ageo; Jirou Asami, Higashimurayama; Yoshio Imura, Kawasaki, all of Japan

[73] Assignee: Nikon Corporation, Tokyo, Japan

[21] Appl. No.: 356,002

[22] Filed: Dec. 14, 1994

[30] Foreign Application Priority Data

| Dec. 14, 1993 | [JP] | Japan | 5-313712 |
| Dec. 14, 1993 | [JP] | Japan | 5-313713 |
| Feb. 4, 1994 | [JP] | Japan | 6-032053 |
| Apr. 8, 1994 | [JP] | Japan | 6-093947 |

[51] Int. Cl.[6] .................................. G03B 17/02
[52] U.S. Cl. .......................... 354/202; 354/288
[58] Field of Search ............... 354/70, 202, 400, 354/430, 288; 348/208

[56] References Cited

U.S. PATENT DOCUMENTS

| 5,001,505 | 3/1991 | Tosaka et al. | 354/288 |
| 5,084,724 | 1/1992 | Maeno | 354/430 |
| 5,150,140 | 9/1992 | Kitazawa | 354/288 |
| 5,153,633 | 10/1992 | Otani | 354/430 |

*Primary Examiner*—A. A. Mathews

[57] ABSTRACT

A camera having improvements in (a) the placement of anti-vibration sensors, (b) the connection between components of an anti-vibration mechanism, (c) the connection between the anti-vibration mechanism and external testing devices and (d) the connection of the camera to a tripod. The camera body has first and second ends and a photographic lens which is positioned on the camera body between the first end and the second end. A battery compartment, first and second anti-vibrations sensors and a main capacitor are all positioned in the first end of the camera body. The first anti-vibration sensor is positioned between the battery compartment and the photographic lens. The first and second anti-vibration sensors reside on the same sensor card and the sensor card has a connector mounted thereon. An anti-vibration CPU resides on a separate, flexible printed circuit card and is connected to the anti-vibration sensors by inserting a potion of the flexible printed circuit card into the connector on the sensor card. Communication terminals are provided inside the camera for allowing external testing equipment to communicate with the anti-vibration sensors and the anti-vibration CPU. Moreover, the shutter release button is on the top of the camera and a tripod is fixed to the bosom of the camera so that depression forces from the pressing of the release switch are transferred to the tripod and do not cause the camera to vibrate.

5 Claims, 11 Drawing Sheets

CAMERA HAVING ANTI-VIBRATION FUNCTION WITH IMPROVED CONNECTION AND PLACEMENT OF ANTI-VIBRATION COMPONENTS

BACKGROUND OF THE INVENTION

1. Field of the Invention

The present invention relates to a camera having an anti-vibration mechanism to compensate for vibrations affecting the camera and, more particularly, to improvements in (a) the placement of anti-vibration sensors, (b) the connection between components of the anti-vibration mechanism, (c) the connection between the anti-vibration mechanism and external testing devices and (d) the connection of the camera to a tripod.

2. Description of the Related Art

A camera can be exposed to a significant amount of vibration during photography. For example, hand tremors and external forces exerted on the camera can cause vibrations which greatly reduce the quality of the resulting photographs. Therefore, some cameras are equipped with vibration correction mechanisms which adjust for vibrations affecting the camera. Conventional vibration correction mechanisms typically include a photographic optical system having an anti-vibration lens which is adjustable in a direction orthogonal to the optical axis of the camera, and a pair of anti-vibration sensors which detect vibration in the pitch and yaw directions, respectively, of the camera. The anti-vibration lens is adjusted by a CPU in accordance with vibrations detected by the pair of anti-vibration sensors. In this manner, the movement of the anti-vibration lens compensates for the vibrations affecting the camera.

The anti-vibration sensors are relatively large as compared to other sensors and actuators provided in the camera. In addition, each anti-vibration sensor requires a respective space inside the camera. Therefore, the camera size becomes large. Also, it is a problem finding space for other components inside the camera. For example, cameras typically use a battery and a main capacitor to generate an electronic flash. The battery and the main capacitor are also relatively large components as compared to other camera components. Thus, the use of anti-vibration sensors with a battery and a main capacitor tend to increase the camera size and create component placement problems.

Moreover, as illustrated in FIGS. 1 and 2, the anti-vibration sensors 54 and 55 are both mounted on the same sensor card 81, but a CPU (not illustrated) for performing vibration compensation is mounted on a separate flexible circuit card (FPC) 82. The CPU is electrically connected to the anti-vibration sensors by connecting the FPC 82 to the sensor card 82 via a press connection. Thus, sensor card 81 has a connection portion 81a. The camera body has a fixed portion 91, a protruding portion 91a and a protruding portion 91b. The sensor card 81, the FPC 82, a compression rubber 83 and a compression plate 84 are layered in succession on fixed portion 91 and held by a fixing screw 85 which is screwed into fixed portion 91. In this manner, a pattern on the FPC 82 and a pattern on the sensor card 81 are electrically connected so that outputs of the anti-vibration sensors 54 and 55 can be provided to the CPU.

However, as shown in FIG. 2, the pressure connection between the sensor card 81 and the FPC 82 requires that the fixing portion 91 be located on the back surface of the sensor card 81. Therefore, electrical components cannot be mounted on the back surface of the sensor card 81. Also, the pressure connection requires a large amount of space on the component mounting surface of the sensor card 81 and, as a result, the amount of space on the component mounting surface of the sensor card 81 is restricted. The sensor card 81 must be made relatively large if a plurality of electrical components are to be mounted on the sensor card 81.

Furthermore, the vibration correction mechanism must be tested during manufacture or repair. During testing, the anti-vibration sensors and the anti-vibration lens drive mechanism must be connected in a subassembly state to external testing devices. The camera is tested and controlled by these external testing devices. Similar testing connections are required to test focus adjustment mechanisms, rangefinding mechanisms and photomerry mechanisms.

The anti-vibration sensors 54 and 55 and the anti-vibration lens drive mechanism are frequently arranged so that they are partially positioned around the photographic lens barrel and towards a front surface side of the camera body. The sensor card 81 is generally mounted in a location between the front cover and the camera body. Therefore, probes functioning as terminals of the external testing devices must be applied to the anti-vibration sensors 54 and 55 and the anti-vibration lens drive mechanism from the front side of the camera.

Two methods are generally used to connect the probes to the anti-vibration sensors 54 and 55 and the anti-vibration lens drive mechanism. In a first method, the front cover of the camera is removed so that the sensor card 81 and contact point terminals on the sensor card 81 are completely exposed. The probes are then applied to the contact point terminals. However, this method cannot be adopted with a camera having the front cover integrally formed with the camera body.

Furthermore, many camera covers have windows formed therein. These windows typically have optical properties to provide a filtering effect or a lens effect and are used as a viewfinder or to receive light for autofocus functions. These windows can experience shifts in precision depending on whether or not the front cover is removed. Thus, the first method of testing is not used when the front cover is integrally formed with the camera body or when the front cover has windows formed therein.

In the second method, a hole is made in the front cover and the probes are inserted through the hole to make contact with the contact point terminals on the sensor card 81. Therefore, this second method can be used with a camera having a front cover integrally formed with the camera body or with a camera in a fully manufactured state. However, it is difficult to perform testing through this hole. Also, it is necessary to conceal the hole by a concealing member, thereby increasing camera cost and design effort.

Moreover, inserting the probes through the hole can cause a deformation of the camera body and inaccurate detection signals from the anti-vibration sensors 54 and 55.

Cameras with an anti-vibration function can also experience problems when fixed to a tripod and performing time exposures (that is, exposures with a shutter speed which is slower than normal). Force is exerted on the camera when the shutter release button is manually pressed. This force causes vibrations. Thus, when the camera is fixed to a tripod and time exposures are performed, a remote operation device is typically used to release the shutter without directly touching the camera body or directly pressing release button. The remote operation device includes a cable release device which uses a cable that must be attached to the camera body while the camera is fixed to the tripod.

Therefore, a connection member is necessary to connect the cable to the camera body. This connection member increases the camera cost and also requires a relatively large amount of space for a connector on the camera body. Also, the use of a cable release requires a significant amount of preparation by the photographer. Further, the cable represents another item which the photographer must carry.

SUMMARY OF THE INVENTION

Accordingly, it is an object of the present invention to provide a camera having improved positioning of anti-vibration sensors, a main capacitor and batteries, while minimizing camera size.

It is also an object of the present invention to provide a camera having an anti-vibration function in which a connection is provided between a sensor card carrying anti-vibration sensors and a flexible printed circuit card carrying an anti-vibration function CPU, wherein the connection requires a minimal amount of space.

It is a further object of the present invention to provide a camera having an anti-vibration function with terminals for communicating with probes from external testing devices, wherein a connection of the terminals to the probes can be performed in a completely assembled, finished camera with a front cover integrally formed to the camera body.

It is an additional object of the present invention to provide a camera in which the connection of anti-vibration sensors to probes from an external testing device does not increase cost or incur design problems and, in addition, does not cause inaccurate detection signals to be output from the anti-vibration sensors.

It is also an object of the present invention to provide a camera which does not require a cable release for remote operation.

Moreover, it is an object of the present invention to provide a camera which does not require cable connectors on the camera body.

Objects of the present invention are achieved by providing a camera comprising a camera body having first and second ends; a photographic lens which is positioned on the camera body between the first end and the second end; a battery compartment positioned in the first end of the camera body; first and second anti-vibration sensors which detect vibrations affecting the camera and are positioned in the first end of the camera body, the first anti-vibration sensor being positioned approximately between the battery compartment and the photographic lens; and a main capacitor which generates an electric flash and is positioned in the first end of the camera body.

Objects of the present invention are also achieved by providing a camera comprising a vibration correction mechanism having an anti-vibration sensor which detects vibrations affecting the camera and produces a corresponding output, and a control unit which receives the output of the anti-vibration sensor and adjusts the camera in response to the detected vibrations; a sensor card having a pattern thereon, the anti-vibration sensor being mounted on the sensor card and electrically connected to the pattern; a connector mounted on the sensor card; and a flexible printed circuit card having a pattern thereon and an insertion portion, the control unit being mounted on the flexible printed circuit card and electrically connected to the pattern, the insertion portion being inserted into the connector to electrically connect the control unit to the anti-vibration sensor via the respective patterns on the sensor card and the flexible printed circuit card.

Moreover, objects of the present invention are achieved by providing a camera which can electrically communicate with an external device, comprising a vibration correction mechanism having an anti-vibration sensor which detects vibrations affecting the camera and produces a corresponding output; a sensor card on which the anti-vibration sensor is mounted; a communication mechanism having a communication terminal and allowing the external device to communicate with the anti-vibration sensor through the communication terminal, the communication terminal not being positioned on the sensor card.

Objects of the present invention are additionally achieved by providing a camera which is fixable to a tripod, comprising a camera body having a top and a bottom; a vibration correction mechanism which detects vibrations and adjusts the camera to compensate for the detected vibrations; an initiation unit which is pushed to begin the detection of vibrations by the vibration correction mechanism and is positioned on the top of the camera body, the initiation unit experiencing a depression force when pressed; a screw hole for fixing a tripod to the camera body, the screw hole being positioned on the bottom of the camera in a location which is approximately opposite the position of the initiation unit and positioned to transfer the depression force to a tripod fixed to the camera body via the screw hole.

BRIEF DESCRIPTION OF THE DRAWINGS

These and other objects and advantages of the invention will become apparent and more readily appreciated from the following description of the preferred embodiments, taken in conjunction with the accompanying drawings, of which.

DESCRIPTION OF THE PREFERRED EMBODIMENTS

FIRST EMBODIMENT

Figure 1:
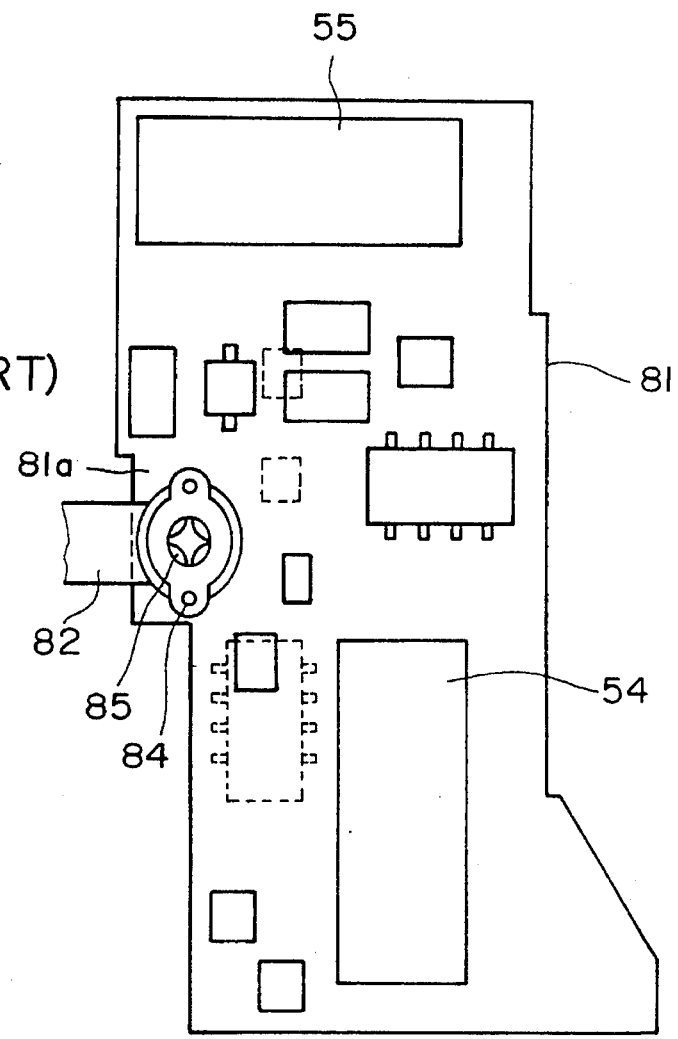
FIG. 1 (PRIOR ART) is a diagram illustrating a conventional method of a card connection in a camera having an anti-vibration mechanism.
Figure 2:
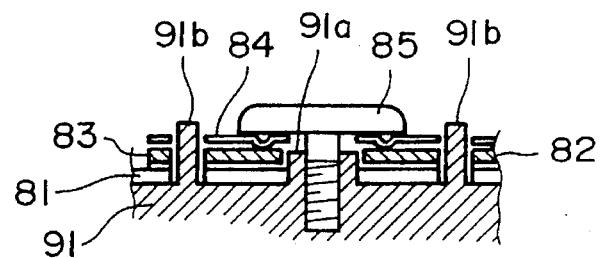
FIG. 2 (PRIOR ART) is a cross sectional view illustrating a conventional method of a card connection in a camera having an anti-vibration mechanism.
Figure 3:
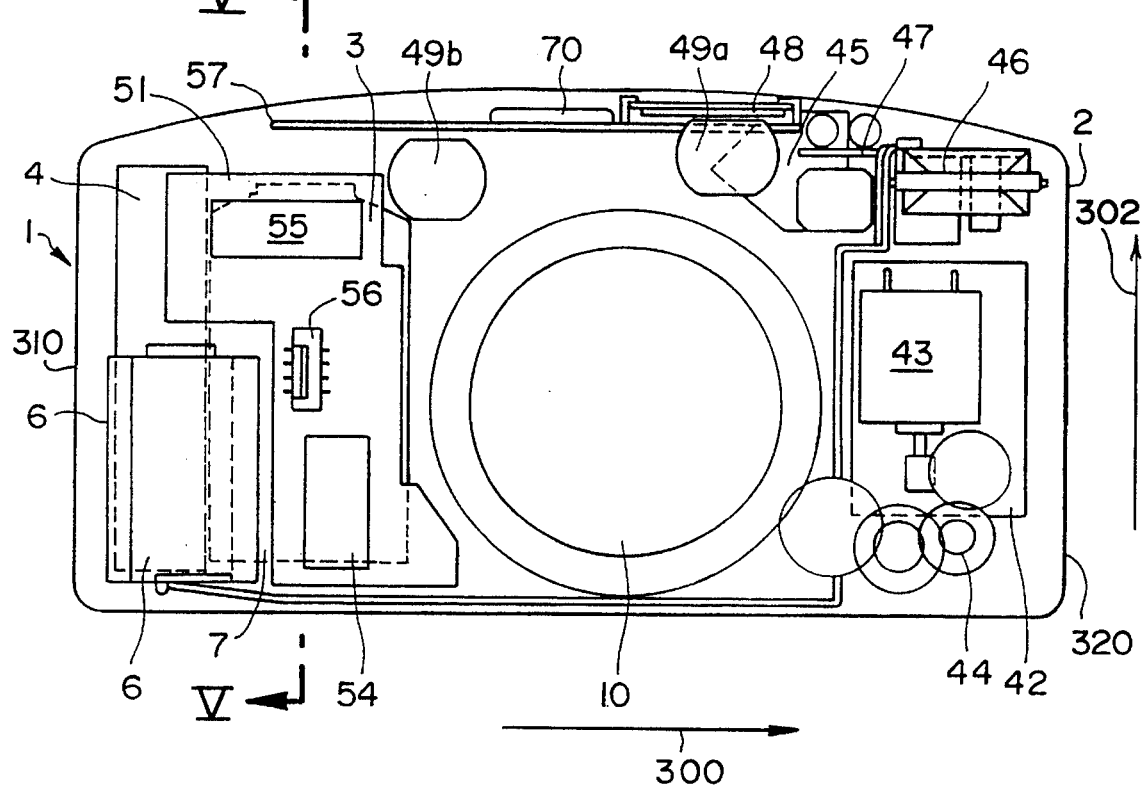
FIG. 3 is a front view of a camera according to a first embodiment of the present invention.
Figure 4:
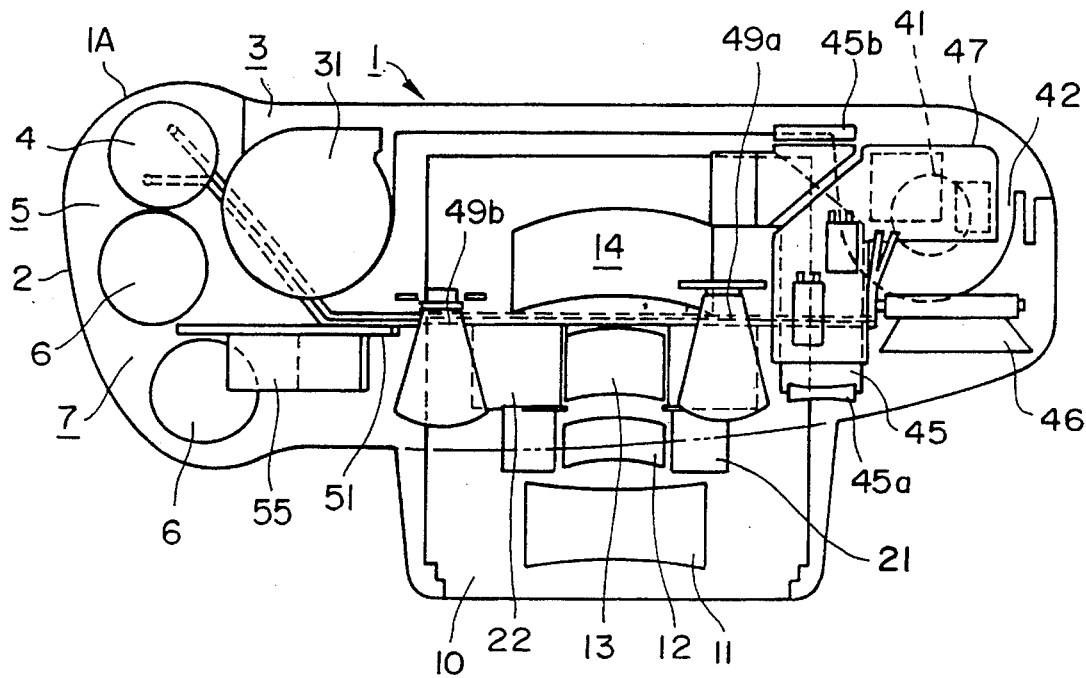
FIG. 4 is a top view of a camera according to the first embodiment of the present invention.
Figure 5:
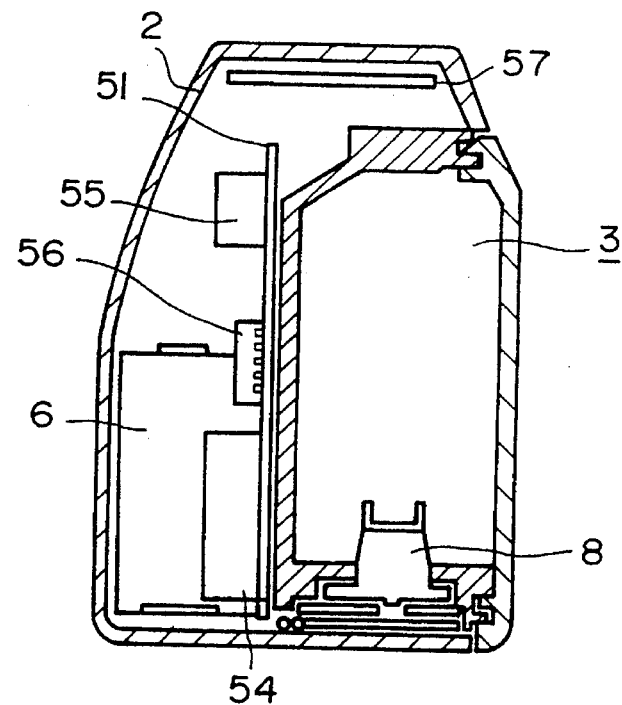
FIG. 5 is a cross section along the line V—V of FIG. 3 of a camera according to the first embodiment of the present invention.

Referring now to the figures, wherein like reference numerals represent similar structures or processes throughout the drawings, and more particularly to FIGS. 3–5 which are a front view, a top view, and a cross section along line V—V in FIG. 3, respectively, of a camera according to a first embodiment of the present invention. In the following discussion, the "subject side" of the camera refers to the front of the camera as seen by a subject being photographed.

As illustrated in FIGS. 3–5, the camera has a camera body 1 which houses various electrical components and a photographic lens 10 is attached to camera body 1 in a central portion of camera body 1. A conventional photographic lens 10 comprises lens groups 11, 12, 13 and 14. Moreover, lens group 13 comprises a conventional anti-vibration lens and will hereinafter be referred to as "anti-vibration lens 13". Camera body 1 has a first end 310 and a second end 320, with a grip portion 1A formed in first end 310. First end 310 refers to the portion of camera body 1 extending from the left boundary of the camera in FIG. 3 to photographic lens 10, and second end 320 refers to the portion of camera body 1 extending from the right boundary of the camera in FIG. 3 to photographic lens 10. A conventional front cover 2 forms a cover or outer shell over camera body 1 to enclose various camera components between camera body 1 and front cover 2. First and second anti-vibration detection sensors 54 and 55 are a pair of vibration detection sensors which detect vibrations in the yaw and pitch directions of the camera, respectively. A conventional main capacitor 4 is used to generate an electronic flash and is accommodated in a capacitor receiving compartment 5. A battery compartment 7 is arranged toward the front (subject side of the camera) in relation to capacitor receiving compartment 5 and accommodates a pair of batteries 6. Battery compartment 7, main capacitor 4 and first and second anti-vibration sensors 54 and 55 are located in one end of the camera body 1 (that is, in the "left" end of camera body 1 as illustrated in FIG. 3).

As illustrated in FIG. 3, first anti-vibration sensor 54 is vertically positioned in a space between battery compartment 7 and photographic lens 10, and second anti-vibration sensor 55 is horizontally positioned in a space between the upper surface of battery compartment 7 and the roof of front cover 2. Battery compartment 7, main capacitor 4, and first and second anti-vibration sensors 54 and 55 are located in grip portion 1A of camera body 1. First and second anti-vibration sensors 54 and 55 are mounted on a single sensor card 51. A connector 56 is disposed on the surface of sensor card 51 for electrically connecting sensor card 51 to other cards. Sensor card 51 is located in the space between batteries 6 and photographic lens 10.

As illustrated in FIG. 3, the camera has a horizontal direction 300 and a vertical direction 302. A main card 57 extends in the horizontal direction along the upper surface of the camera. A conventional main CPU 70 performs shutter control, focusing control and similar control operations of the camera. A conventional liquid crystal display device 48 and a driver (not illustrated) of liquid crystal display device 48 are mounted on main card 57. When a conventional shutter release button (not illustrated) is pushed by the photographer, main CPU 70 outputs drive signals in a conventional manner to a conventional lens shutter device 21 via patterns of main card 57 and other cards (not illustrated). Lens shutter device 21 is integrally arranged on the circumferential portion of lens group 12. In response to the drive signals from CPU 70, lens shutter device 21 drives the shutter (not illustrated) to perform a conventional shutter release.

Anti-vibration detection sensors 54 and 55 are connected to a vibration correction CPU (not illustrated) via connector 56 on sensor card 51. Therefore, output signals of anti-vibration detection sensors 54 and 55 travel via a pattern on sensor card 51, through connector 56, to the vibration correction CPU. When the shutter is being released, the vibration correction CPU uses the output of anti-vibration detection sensors 54 and 55 to calculate a target amount of movement in a direction orthogonal to the optical axis of anti-vibration lens 13. Vibration correction CPU outputs a lens drive signal proportional to this calculated target amount of movement. This lens drive signal is provided to a conventional anti-vibration drive mechanism 22 which is integrally arranged on the external circumference of anti-vibration lens 13 to drive anti-vibration lens 13 in a direction orthogonal to the optical axis. Anti-vibration drive mechanism 22 comprises conventional X and Y direction motors (not illustrated) and a conventional motive power transmission mechanisms (not illustrated) which transmit the rotation of the X and Y direction motors to anti-vibration lens 13 and cause anti-vibration lens 13 to be driven in the X direction and Y direction. The X and Y directions are each orthogonal to the optical axis direction. Thus, in response to the lens drive signal, motors (not illustrated) within anti-vibration drive mechanism 22 are driven to move anti-vibration lens 13 in a direction orthogonal to the optical axis. As a result, the camera prevents blurring of the photographic image caused by hand tremors or vibrations.

A conventional infrared light projection device 49a and a conventional light receiving device 49b provide a rangefinding function for autofocusing and are arranged at a top portion of photographic lens 10. A conventional strobe light generator 46 is connected to a conventional strobe circuit unit 47 to generate a strobe. The camera also has a conventional viewfinder 45 which comprises an objective lens 45a and an ocular lens 45b. A conventional liquid crystal display device 48 is used to provide an external display for the photographer.

While grip portion 1A is located on one side (left side in FIG. 4) of camera body 1, a film spool compartment 42 is located at the other side (right side in FIG. 4) of camera body 1. Film spool compartment is formed to rotatably accommodate a film spool 41. A conventional zooming motor 43 is connected to a conventional gear unit 44 for driving photographic lens 10. As illustrated in FIG. 3, zooming motor 43 is vertically positioned in front of spool compartment 42. Gear unit 44 is located in a lower portion of spool compartment 42. Viewfinder 45 is located adjacent to zooming motor 43 and spool compartment 42. A film cartridge compartment 3 is for the insertion of a film cartridge 31. Film is stored on spool 41 and rewound by a conventional film rewind fork 8. Film rewind fork 8 is rotatably disposed in the bottom of cartridge compartment 3. As illustrated in FIG. 3, strobe light generator 46 is located at the upper portion of zooming motor 43 and from the upper portion of spool compartment 42, suspended in the upper portion of viewfinder 45.

Figure 6:
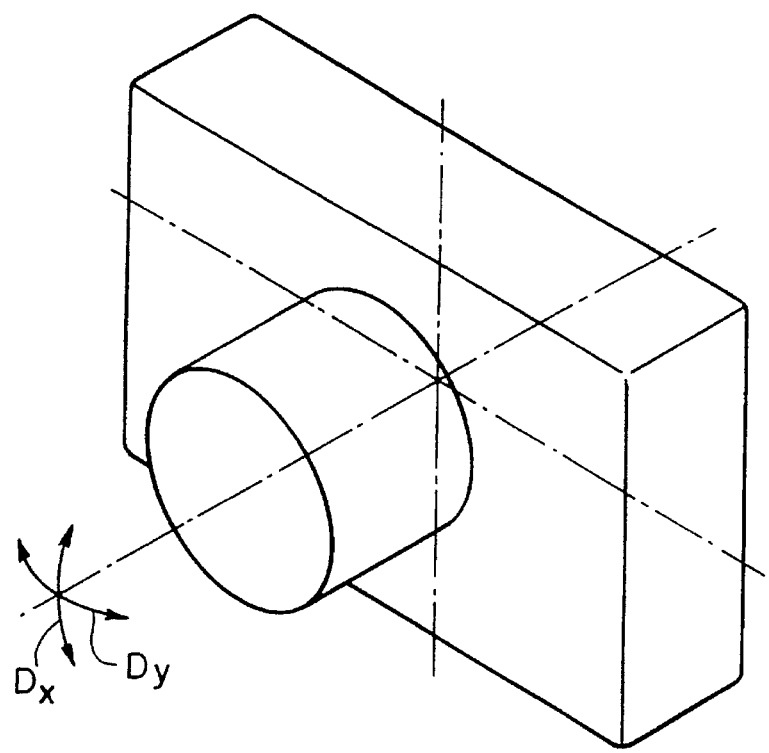
FIG. 6 is a diagram illustrating the pitch and yaw directions of a camera according to an embodiment of the present invention.

FIG. 6 illustrates the yaw direction Dy and the pitch direction Dx of the camera. As previously described, anti-vibration detection sensors 54 and 55 detect vibrations in the yaw direction Dy and the pitch direction Dx, respectively. Anti-vibration detection sensor 54 (detecting vibration in yaw direction Dy) is vertically positioned (see FIG. 3) on a front surface lower portion of sensor card 51, and anti-vibration detection sensor 55 (detecting vibration in the pitch direction Dx) is horizontally positioned (see FIG. 3) on a front surface upper portion of the sensor card 51. Anti-vibration detection sensors 54 and 55 are preferably angular detection sensors.

In a camera according to the first embodiment of the present invention, battery compartment 7, main capacitor 4 and first and second anti-vibration sensors 54 and 55 are located in one end portion side of the camera body, and at least first anti-vibration sensor 54 is located in the space between battery compartment 7 and photographic lens 10. Thus, the limited space inside the camera is efficient utilized and the camera can be designed with a smaller size.

Anti-vibration sensors 54 and 55 are preferably angular acceleration sensors. However, they may be other types of sensors. Moreover, in a camera according to the first embodiment of the present invention, battery compartment 7, main capacitor 4 and first and second anti-vibration sensors 54 and 55 are located together in grip portion 1A of camera body 1; however, they may be located in the end portion on the opposite side from grip portion 1A.

In a camera according to the first embodiment of the present invention, first and second anti-vibration sensors 54 and 55 are used as yaw direction and pitch direction angular acceleration sensors, respectively, by vertically positioning first anti-vibration sensor 54 in the space between battery compartment 7 and photographic lens 10, and by horizontally positioning second anti-vibration sensor 55 in the space between the upper surface of battery compartment 7 and the roof of front cover 2. As a result of this positioning, it is possible to efficiently utilize the limited space inside the camera and first and second anti-vibration sensors 54 and 55 can be conveniently located with respect to the detection directions. Moreover, if battery compartment 7, main capacitor 4 and first and second anti-vibration sensors 54 and 55 are located in grip portion 1A of camera body 1, the camera design efficiently utilizes the space within grip portion 1A since grip portion 1A is wider than the end of camera body 2 (that is, the right side of camera body 2 in FIG. 4).

Furthermore, by mounting first and second anti-vibration sensors 54 and 55 on a single sensor card 51, the camera uses a reduced number of parts and the compactness of the camera is increased.

SECOND EMBODIMENT

Figure 7:
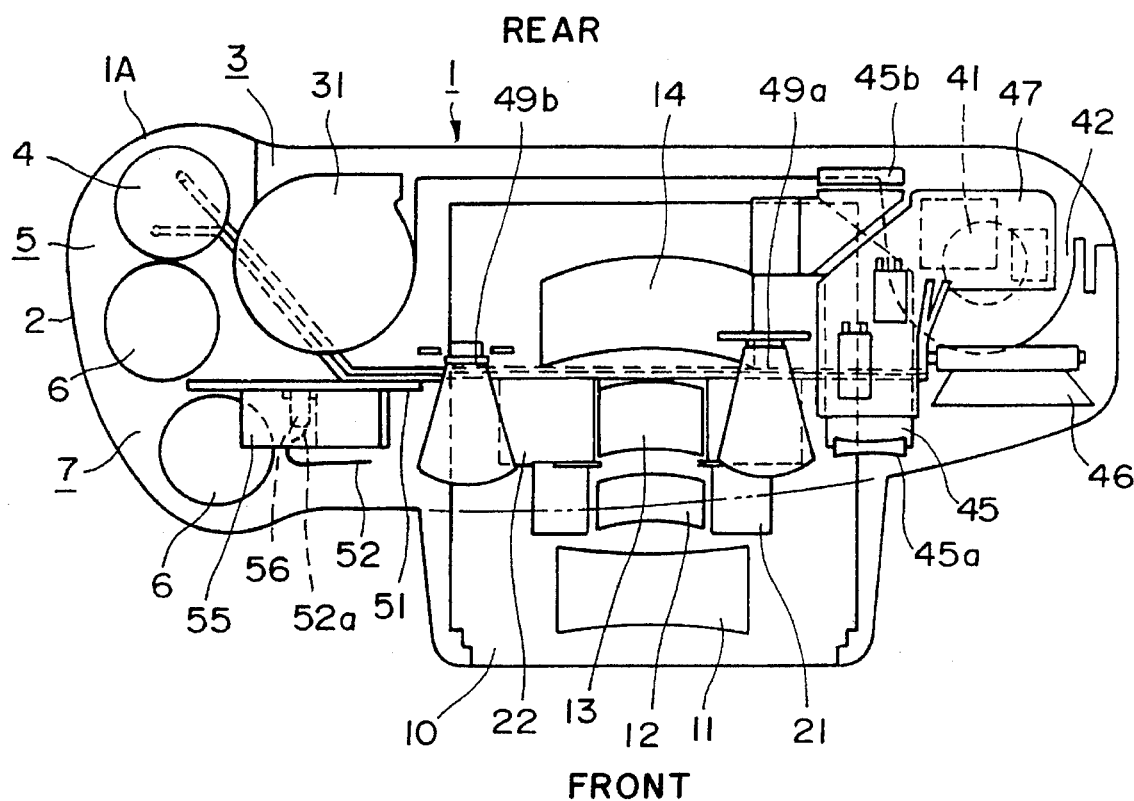
FIG. 7 is a top view of a camera according to a second embodiment of the present invention.
Figure 8:
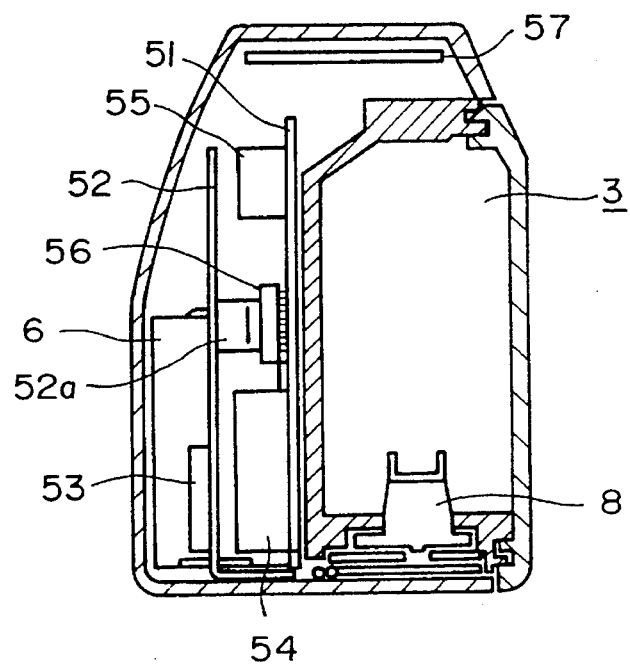
FIG. 8 is a cross section along the line V—V of FIG. 3 according to the second embodiment of the present invention.

FIGS. 7–11 represent a second embodiment which is similar to the first embodiment illustrated in FIGS. 3–6. Referring now to FIGS. 7 and 8 which are a top view of a camera according to the second embodiment of the present invention and a cross section along the line V—V in FIG. 3, respectively, an anti-vibration CPU 53 is mounted on a flexible printed card (main FPC 52). An arm portion 52a of main FPC 52 connects anti-vibration CPU 53 on main FPC 52 to anti-vibration sensors 54 and 55 via connector 56 mounted on a tip portion of sensor card 51.

Figure 9:
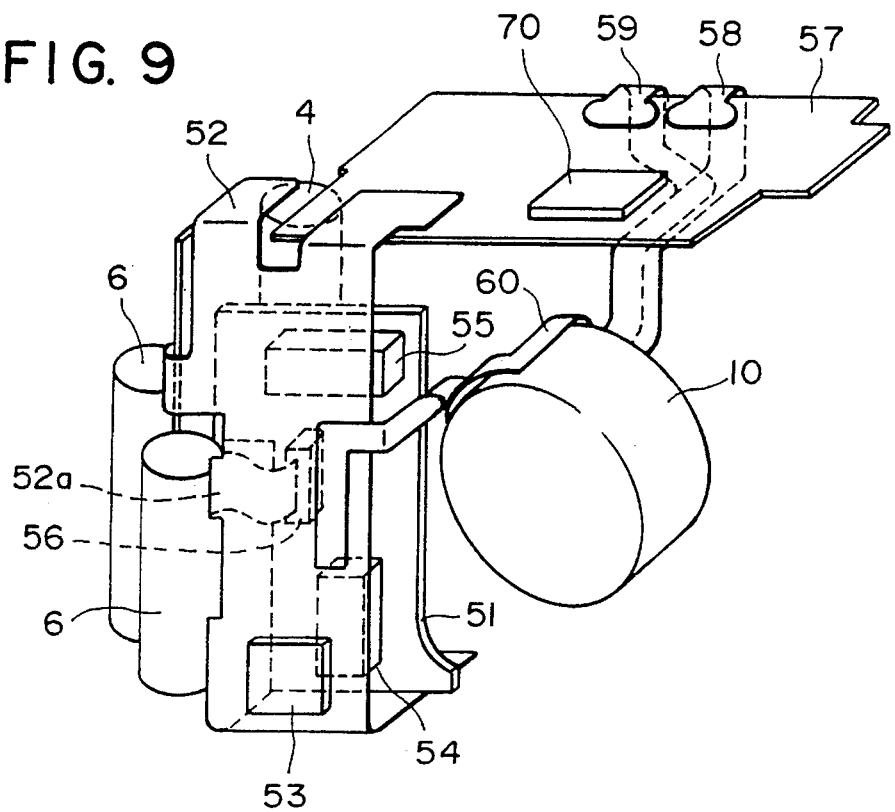
FIG. 9 is an oblique view illustrating the location of anti-vibration sensors and other related electrical components in a camera according to the second embodiment of the present invention.
Figure 10:
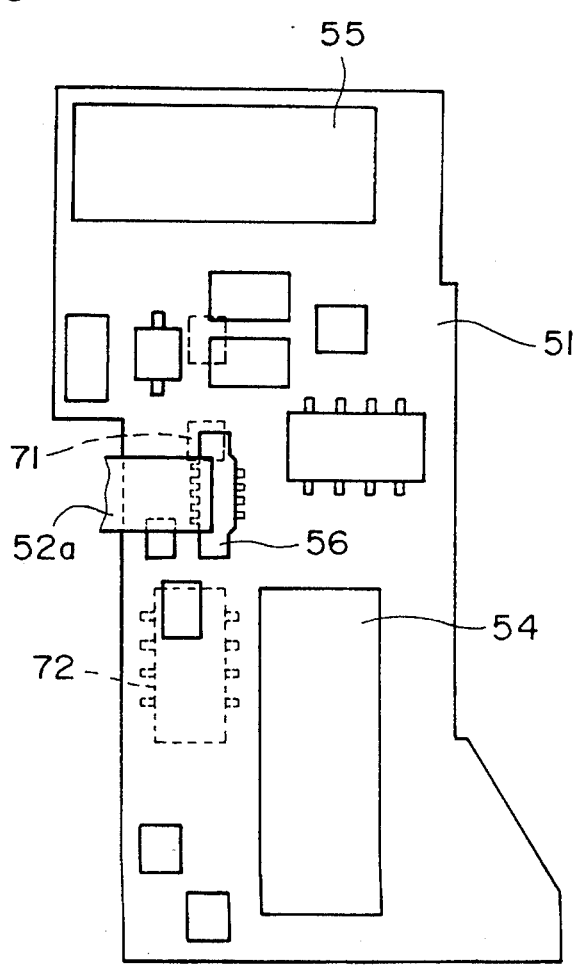
FIG. 10 is a front view of an anti-vibration sensor card in a camera according to the second embodiment of the present invention.
Figure 11:
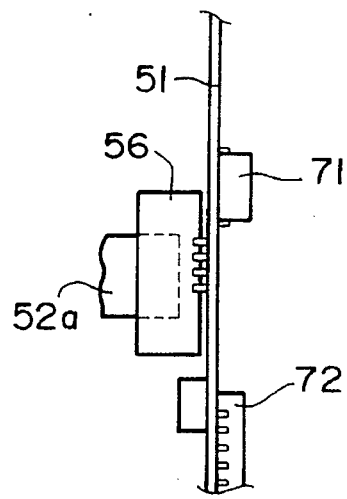
FIG. 11 is a diagram illustrating a perpendicular type connector in a camera according to the second embodiment of the present invention.

The wiring structure of the second embodiment is discussed below with reference to FIGS. 9–11, which are an oblique view illustrating the location of anti-vibration sensors and other related electrical components in a camera according to the second embodiment of the present invention, a front view of a sensor card in a camera according to the second embodiment of the present invention and a diagram illustrating a perpendicular type connector in a camera according to the second embodiment of the present invention, respectively. Sensor card 51 is located in a space between batteries 6 and photographic lens 10. Main FPC 52 is located in a forward direction of the camera, that is, closer towards the front of the camera than towards the rear of the camera. First and second anti-vibration sensors 54 and 55 are mounted on sensor card 51 and anti-vibration CPU 53 is mounted on main FPC 52. First anti-vibration sensor 54 is mounted in a lower front surface portion of sensor card 51, and second anti-vibration sensor 55 is mounted in an upper front surface portion of sensor card 51. Connector 56 is a perpendicular type connector and is positioned on the surface of sensor card 51 via plural lead terminals (not illustrated) so that connector 56 extends in a perpendicular direction from sensor card 51. Arm portion 52a of main FPC 52 is inserted in a socket disposed in connector 56. A pattern is formed on sensor card 51 and the pattern connects to the lead terminals in the socket to connect this pattern to the pattern of arm portion 52a. In this manner, the pattern on sensor card 51 and the pattern on main FPC 52 are electrically connected and the detection outputs of first and second anti-vibration sensors 54 and 55 can be input to anti-vibration CPU 53 so that anti-vibration CPU 53 can perform anti-vibration calculations and functions.

By connecting the patterns of sensor card 51 and main FPC 52 using perpendicular type connector 56, there is no need to arrange fixing members on the back surface of sensor card 51. As a result of using a perpendicular type connector 56, as illustrated in FIGS. 10 and 11, conventional electrical components 71 and 72 can also be mounted on the back surface of sensor card 51. Moreover, less space is required for card connection in comparison with the conventional pressure connection method. Thus, a greater number of electrical components can be mounted on the surface of sensor card 51 as compared to a camera using the conventional pressure connection method.

Main FPC 52 is connected to main card 57. Main card 57 extends in a horizontal direction of the camera along the top surface of the camera. Main CPU 70 is mounted on main card 57 and performs shutter control, focusing control and other camera functions. A conventional driver circuit (not illustrated) for driving device 48 is also mounted on main card 57. A FPC 58 is used for shutter control and has one end connected to lens shutter device 21 and the other end connected to main card 57. Lens shutter device 21 is positioned within photographic lens 10.

A photointerruptor (not illustrated) and a detection mechanism (not illustrated) are built into photographic lens 10 to detect the position of the focusing lens group (for example, lens group 14). A FPC 59 for focusing use has one end connected to the detection mechanism and the other end connected to main card 57. A FPC 60 for anti-vibration functions has one end connected to anti-vibration drive mechanism 22 within photographic lens 10, and the other end connected to main FPC 52. Main CPU 70, for example, performs focus detection when the camera's release button (not illustrated) is pressed halfway (that is, pressed to a conventional half-push position). Based on the results of focus detection, focusing is performed by causing focusing lens group 14 to move in the optical axis direction. During this movement, the detection output of the lens position detection mechanism is successively input to main CPU 70 via the patterns on the focusing FPC 59 and on main card 57, and main CPU 70 performs control of focusing while monitoring the lens position detection output. After this, when the release button is fully depressed (that is, pressed to a conventional full-push position), main CPU 70 outputs a shutter drive signal to lens shutter device 21 via the patterns of main card 57 and the sensor control FPC 58. In response to this shutter drive signal, lens shutter device 21 drives the shutter and performs shutter release.

Via the pattern on sensor card 51, connector 56 and the pattern on main FPC 52, the detection outputs of first and second anti-vibrations 54 and 55 are input to anti-vibration CPU 53. While shutter release is being performed, anti-vibration CPU 53 calculates a target amount of movement of anti-vibration optical system 13 in a direction orthogonal to the optical axis, based on the detection outputs. Anti-vibration CPU 53 outputs a lens drive signal proportional to this target amount of movement. This lens drive signal is input to anti-vibration drive mechanism 22 via the respective patterns on main FPC 52 and the anti-vibration FPC 60. As a result, the motors in anti-vibration drive mechanism 22 drive anti-vibration optical system 13 so that anti-vibration optical system 13 moves in directions which are orthogonal to the optical axis. As a result, the camera prevents blurring of the photographic image caused by hand tremors and other vibrations. The locations and positions of sensor card 51 and main FPC 52 are not intended to be limited to the above embodiment example.

In a camera according to the second embodiment of the present invention, a portion (such as arm portion 52a) of a flexible printed card (such as main FPC 52) is inserted into a socket of a connector (such as connector 56) mounted on a sensor card (such as sensor card 51). The pattern on the sensor card and the pattern on the flexible printed card are electrically connected. As a result, it is not necessary to use members for fixing purposes on the back surface side of the sensor card, and it becomes possible to mount electrical components on the back surface of the sensor card. In addition, because less space is taken up for card connection, the size of the camera can accordingly be reduced.

Moreover, in a camera according to the second embodiment of the present invention, batteries 6 and main capacitor 4 are located adjacent to each other on the same end of camera body 1. In addition, the limited space inside the camera body is more efficiently used if at least a portion of sensor card 51 is inserted into the space between a battery 6 and photographic lens 10 and, as a result, the camera size can be reduced. In particular, the grip portion 1A end side of camera body 1 can be reduced in size if batteries 6 and main capacitor 4 are located in the grip portion 1A end side of camera body 1 towards the top of the camera. Grip portion 1A end side of camera body 1 is thicker than the other end portion (right side of camera in FIG. 7) of camera body 1.

In a camera according to the second embodiment of the present invention, a vibration correction mechanism comprises anti-vibration sensors 54 and 55 which detect vibrations affecting the camera and produce a corresponding output, and a control unit (CPU 53) which receives the output of the anti-vibration sensor and adjusts the camera in response to the detected vibrations. Sensor card 51 has a pattern thereon and anti-vibration sensor 54 and 55 are mounted on sensor card 51 and electrically connected to the pattern. Connector 56 is mounted on sensor card 51. Flexible printed circuit card 52 has a pattern thereon and an insertion portion (arm portion 52a). The control unit (CPU 53) is mounted on flexible printed circuit card 52 and is electrically connected to the pattern. The insertion portion (arm portion 52a) is inserted into connector 56 to electrically connect the control unit (CPU 53) to anti-vibration sensors 54 and 55 via the respective patterns on sensor card 51 and flexible printed circuit card 52.

THIRD EMBODIMENT

Figure 12:
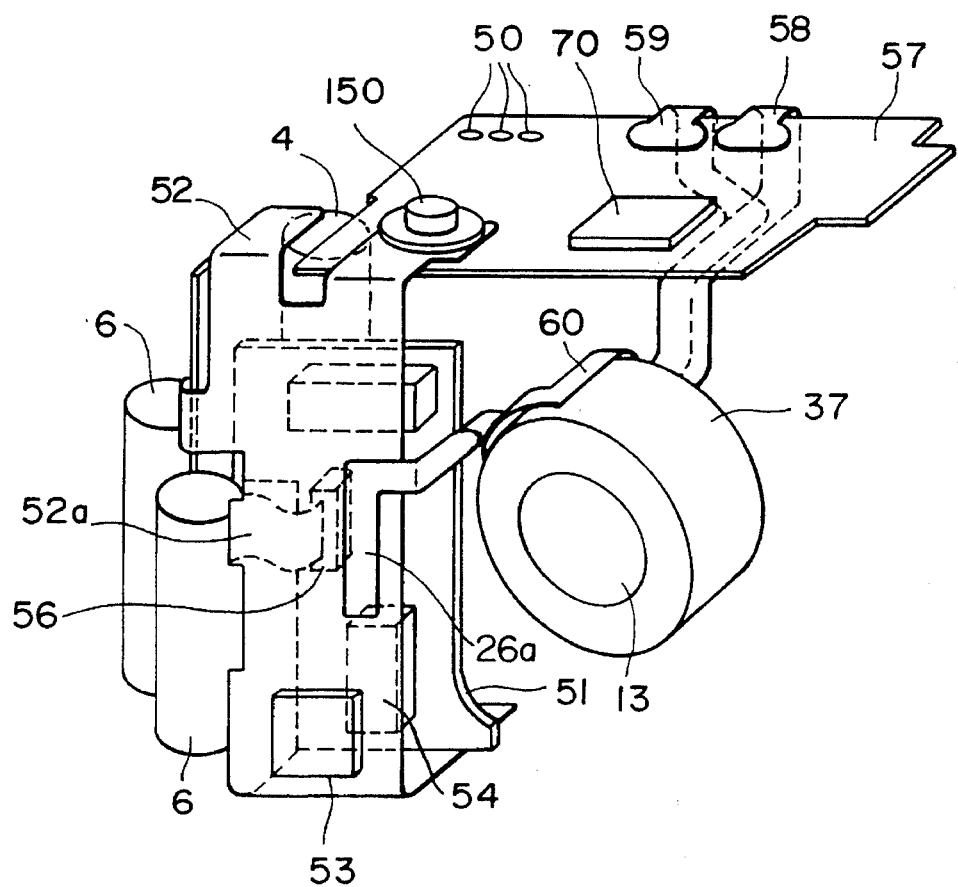
FIG. 12 is an oblique view illustrating the location of anti-vibration sensors and other related electrical components in a camera according to a third embodiment of the present invention.
Figure 13:
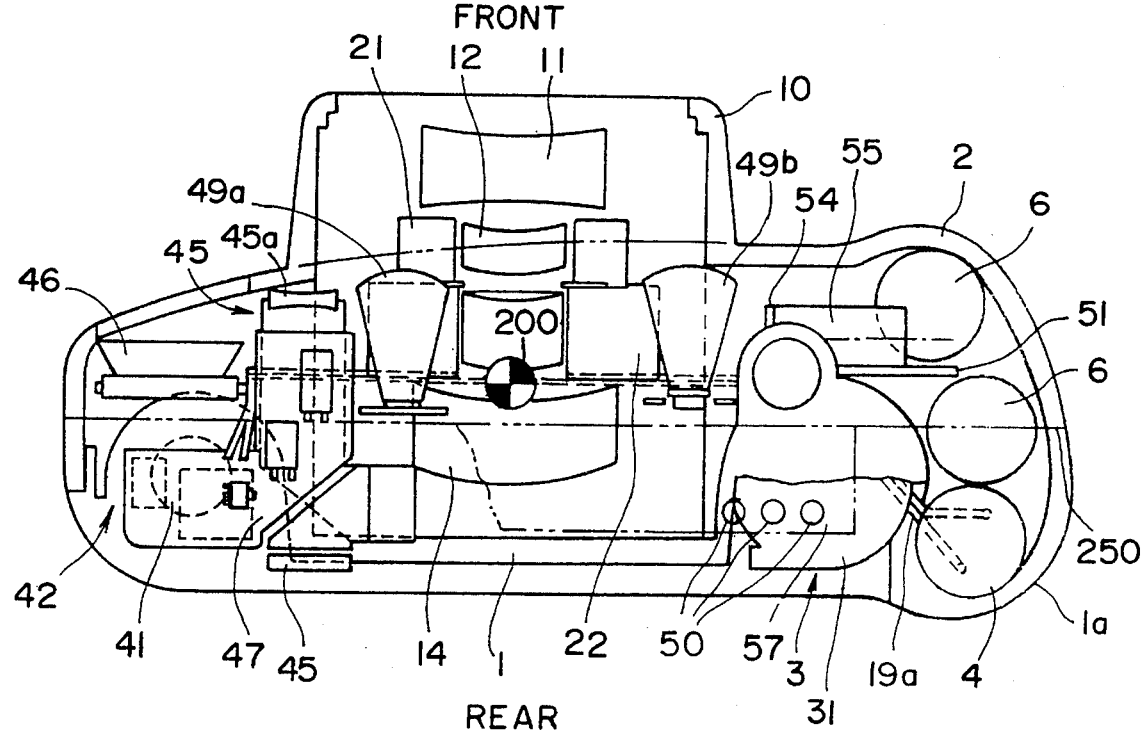
FIG. 13 is a top view of a camera according to the third embodiment of the present invention.
Figure 14:
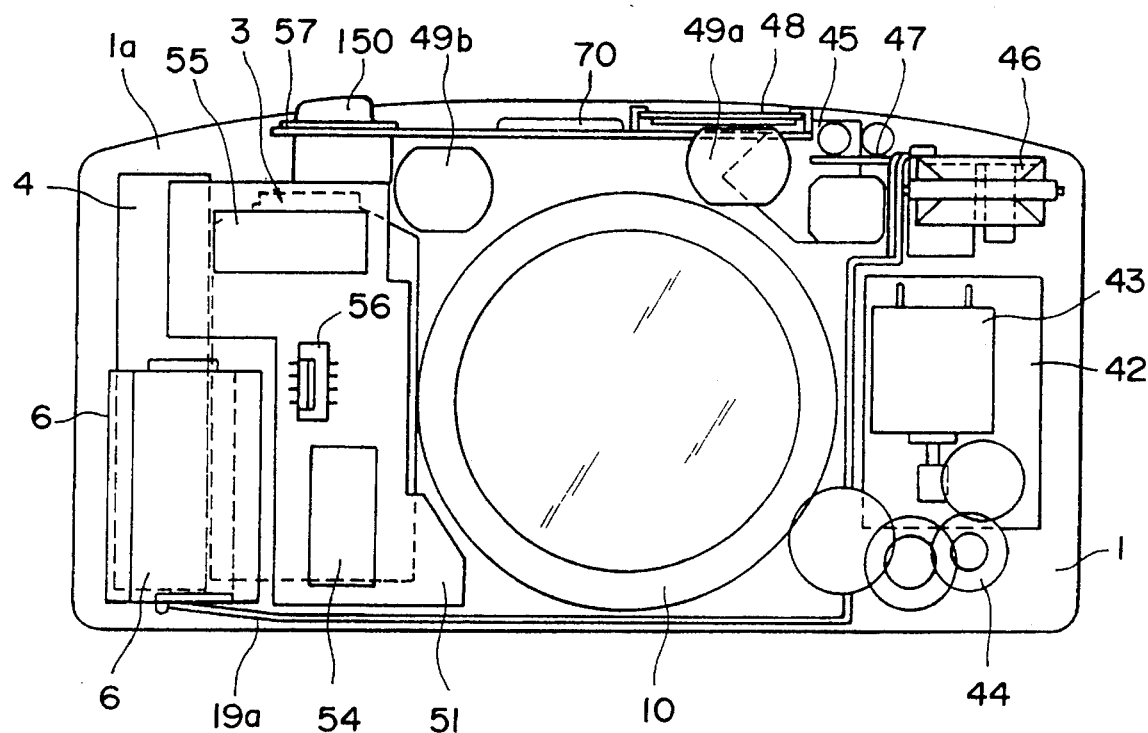
FIG. 14 is a front view of a camera according to the third embodiment of the present invention.

FIGS. 12–14 illustrate a camera according to a third embodiment of the present invention. In this embodiment, as illustrated in FIGS. 13 and 14, camera body 1 has a centrally positioned zoom photographic lens 10 and, as seen from the front side (subject side) of camera body 1, camera body 1 is equipped with a cartridge compartment 3 which accommodates film cartridge 31. As illustrated in FIGS. 13 and 14, sensor card 51 and a battery 6 are located in the front side of cartridge compartment 3 (see FIGS. 13 and 14). Another battery 6 is accommodated at the rear side of the first battery 6. Furthermore, grip portion 1a is shaped so that the photographer can easily hold the camera. Main capacitor 4 is positioned within grip portion 1a. As illustrated in FIGS. 13 and 14, a lead wire 19a connects main capacitor 4 and strobe circuit unit 47 and is wired in a bottom space portion of camera body 1 below sensor card 51.

Anti-vibration sensor 54, detecting the amount of vibration in the yaw direction (X axis direction), is mounted transverse to batteries 6 and slightly above lead wire 19a. Anti-vibration sensor 55, detecting the amount of vibration in the pitch direction (Y axis direction), is mounted above batteries 6. This positioning of anti-vibration sensors 55 and 55 efficiently utilizes space within the camera and thereby reduces camera size.

A shutter release button 150 performs conventional ON and OFF operation of a shutter release switch (not illustrated) and also starts the detection of vibration by anti-vibration sensors 54 and 55. Photographic lens 10, as shown in FIG. 13, is equipped with photographic lens groups 11, 12 and 14. Shutter device 21 is mounted on lens group 12. Infrared light projection device 49a and light receiving device 49b together form a rangefinding device for autofocusing. CPU 70 controls the operation of the camera and is mounted on main card 57. Viewfinder 45 includes objective lens 45a and ocular lens 45b. As illustrated in FIG. 14, infrared light projection device 49a, light receiving device 49b, CPU 70, main card 57, display device 48 and viewfinder 45 are located above photographic lens 10. A spool compartment 42 is arranged in the right-hand side portion of the camera, as seen from the front side (subject side) of camera body 1. Spool compartment 42 has a film advance motor (not illustrated) built into spool 41. Zooming motor 43 and gear unit 44 are located in a space on the front side (subject side) of spool compartment 42 (see FIG. 14). Strobe light generator 46 and strobe circuit unit 47 are located above spool compartment 42. FIG. 13 illustrates the position of the center of gravity 200 in camera body 1. In FIG. 13, front cover 2 is located on the front surface side of camera body 1. Sensor card 51, on which are mounted anti-vibration sensors 54 and 55, is inserted between camera body 1 and front cover 2. A separation line 250 illustrates the separation of front cover 2 from camera body 1.

As illustrated in FIG. 12, main FPC 52 is loaded with anti-vibration CPU 53. A connection end of main FPC 52 is connected by connector 56 to sensor card 51. Main FPC card 52 is connected at its upper end portion to main card 57. Shutter release button 150 is a conventional shutter release button and is arranged on main FPC card 52 and is connected to a connecting end portion of main FPC card 52. The depression pressure operation of shutter release button 150 is received by main card 57, and does not bring about any deformation of sensor card 51. FPC 60 electrically connects anti-vibration sensors 54 and 55 on sensor card 51 by having one end connected to anti-vibration drive mechanism 22 and the other end connected to main FPC 52. FPC 58 is used for shutter control and has one end connected to lens shutter device 21 and the other end connected to main card 57. FPC 59 is for focusing and is connected to main card 57.

As illustrated in FIG. 12, communication terminals 50 are located on a portion of main card 57 at which a contact connection to an external probe is possible. Since sensor card 51 and main FPC 52 are both connected to main card 57, communication terminals 50 make is possible to connect a probe from external testing equipment to sensor card 51, having anti-vibration sensors 54 and 55 mounted thereon, and with main FPC 52, having anti-vibration CPU mounted thereon. The portion of main card 57 on which communication terminals 50 are located is a portion which is independent of sensor card 51. Thus, vibrations affecting main card 57 from external probes pressing against main card 57 will not be transferred to sensor card 51. Communication terminals 50 are positioned on a side of main card 57 which is intended to be read or interfaced to an external device. This side of main card 57 faces front cover 2.

In a camera according to the third embodiment of the present invention, anti-vibration sensors 54 and 55 are mounted on sensor card 51. Anti-vibration CPU 53 is mounted on main FPC 52. Main FPC 52 is a separate card from sensor card 51. Thus, an external device can communicate with anti-vibration sensors 54 and 55 and with anti-vibration CPU 53 by contacting communication terminals 50 on main card 57. Communication terminals 50 are arranged in an upper portion of camera body 1. Therefore, an external device can communicate with anti-vibration sensors 54 and 55 and anti-vibration CPU 53 without requiring removal of front cover 2. An external testing device can also communicate with photomerry and rangefinding circuits via communication terminals 50.

In a camera according to the third embodiment of the present invention, it is not required to open a hole in front cover 2 (as was required in the prior art). Moreover, in a camera according to the third embodiment of the present invention, probes are not directly applied to sensor card 51 so that there is no risk of deformation to front cover 2 or camera body 1. Also, the probes will not cause inaccurate detection output signals from anti-vibration sensors 54 and 55.

Moreover, since communication terminals 50 are arranged on main card 57, communication terminals 50 can be used to connect an external probe to photometric and rangefinding circuits since these circuits normally requiring testing by external devices.

In a camera according to the third embodiment of the present invention, communication terminals 50 are arranged in a portion of main card 57 and main card 57 is located in the upper side of the camera. Therefore, with front cover 2 assembled to camera body 1, communication could be performed by applying probes of an external device with front cover 2 assembled to camera body 1. However, if testing is performed in a sub-assembly state with front cover 2 assembled to the camera, communication terminals 50 are freely arranged in a suitable position. Communication terminals 50 are connected by a conventional wiring method to sensor card 51.

In a camera according to the third embodiment of the present invention, communication terminals 50 are arranged on a card which is independent of sensor card 51. For example, communication terminals 50 are arranged on a separate card from sensor card 51. This independent positioning of communication terminals 50 provides excellent advantages. Specifically, in a state with front cover 2 assembled to camera body 1, probes of an external device are applied to communication terminals 50 and communication is simply and reliably performed. Removal of front cover 2 is unnecessary. Moreover, it is unnecessary to open a hole in the front cover 2. Probes of an external device can be connected to communication terminals 50 merely by removing a back cover (not illustrated) of the camera.

Furthermore, in a camera according to the third embodiment of the present invention, probes are not directly applied to the card on which the anti-vibration sensors are mounted. As a result, there is no anxiety that deformation and anomalous detection signals will arise.

Moreover, in a camera according to the third embodiment of the present invention, communication terminals 50 for communicating between an external device and anti-vibration sensors 54 and 55 are arranged, for example, in common on a main card 57 which houses photometric or rangefinding circuits. Therefore, communication terminals 50 can also be used to communicate with the photometric and rangefinding circuits.

In a camera according to the third embodiment of the present invention, communication terminals 50 for communication with anti-vibration sensors 54 and 55 and for communication with anti-vibration CPU 53 are mounted in an independent main card 57. Photometry and rangefinding circuits are also mounted on main card 57. These photometry and rangefinding circuits require communication terminals in order to adjust these circuits with the front cover 2 assembled to the camera body 1. Thus, by also placing communication terminals 50 on main card 57, the anti-vibration sensors 54 and 55 and anti-vibration CPU 53 can also be testing without removing front cover 2.

A camera according to the third embodiment of the present invention comprises a vibration correction mechanism that includes anti-vibration sensors 54 and 55 mounted on sensor card 51. A control unit (CPU 53) receives the output of anti-vibration sensors 54 and 55 and adjusts the camera in response to the detected vibration. A communication mechanism (such as main card 57 being electrically connected to sensor card 51 and main FPC 52) has communication terminals 50 to allow an external device to communicate with anti-vibration sensors 54 and 55 and with the control unit (CPU 53) through communication terminals 50. Communication terminals 50 are not positioned on sensor card 51 or main FPC 52.

FOURTH EMBODIMENT

Figure 15:
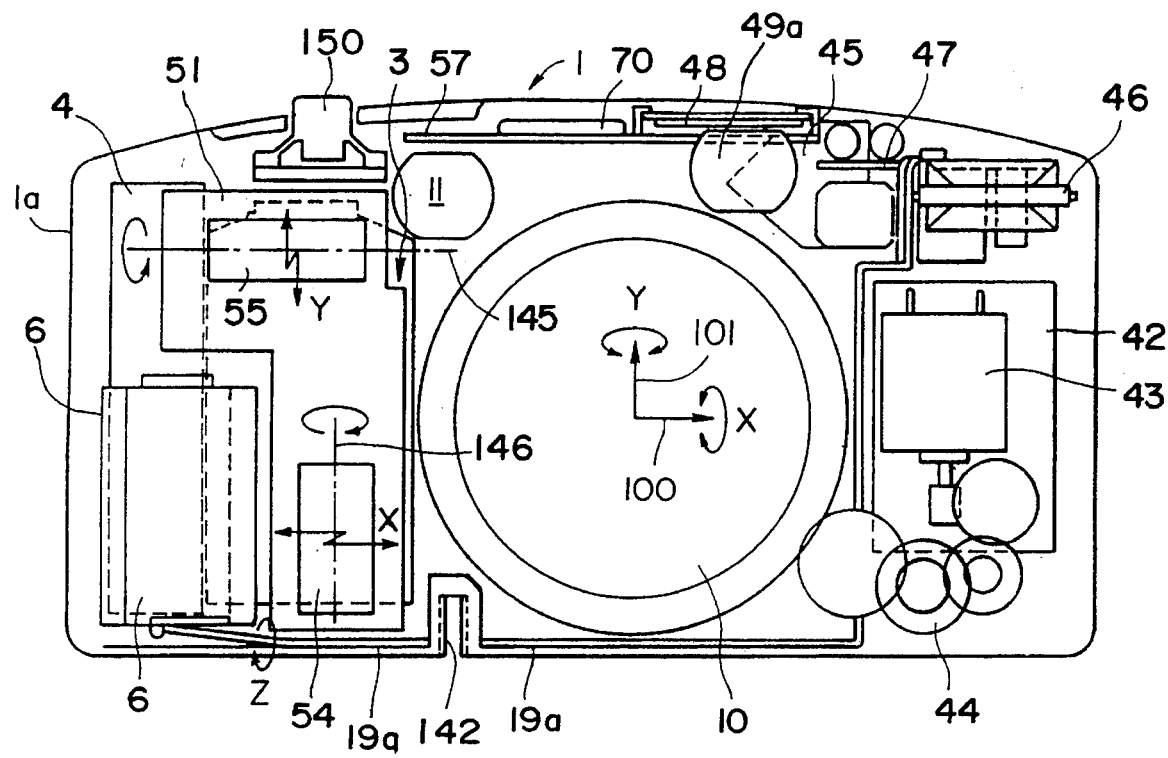
FIG. 15 is a front view of a camera according to a fourth embodiment of the present invention.
Figure 16:
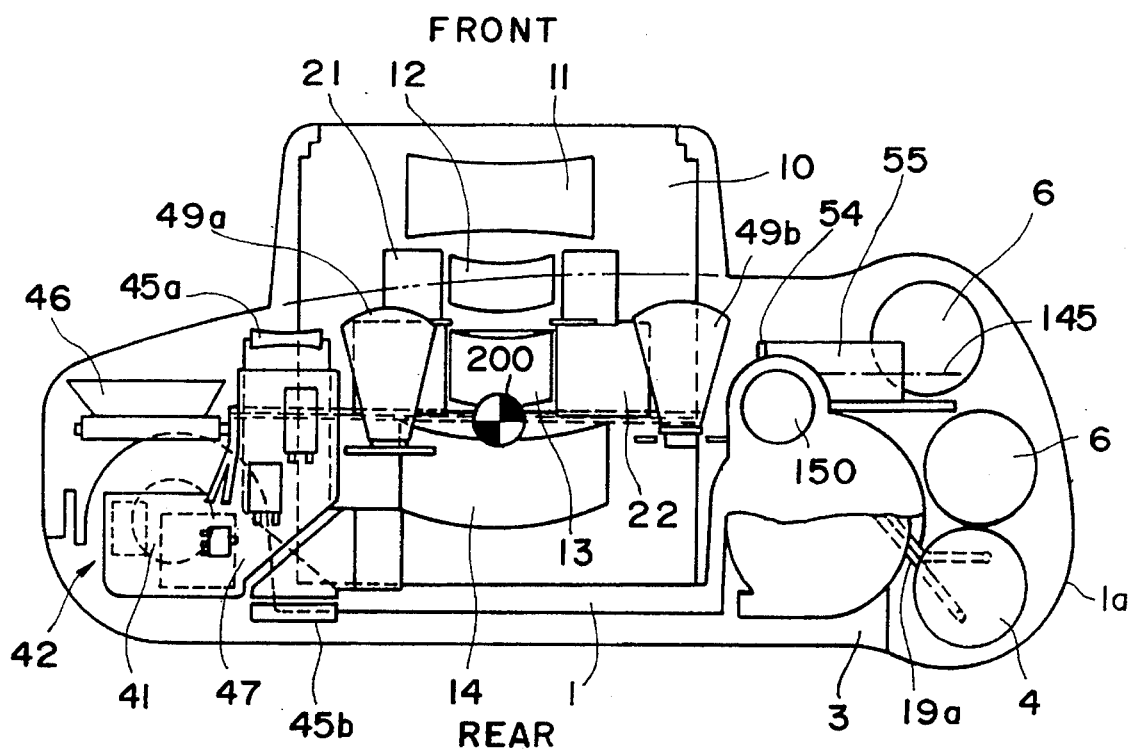
FIG. 16 is a top view of a camera according to the fourth embodiment of the present invention.
Figure 17:
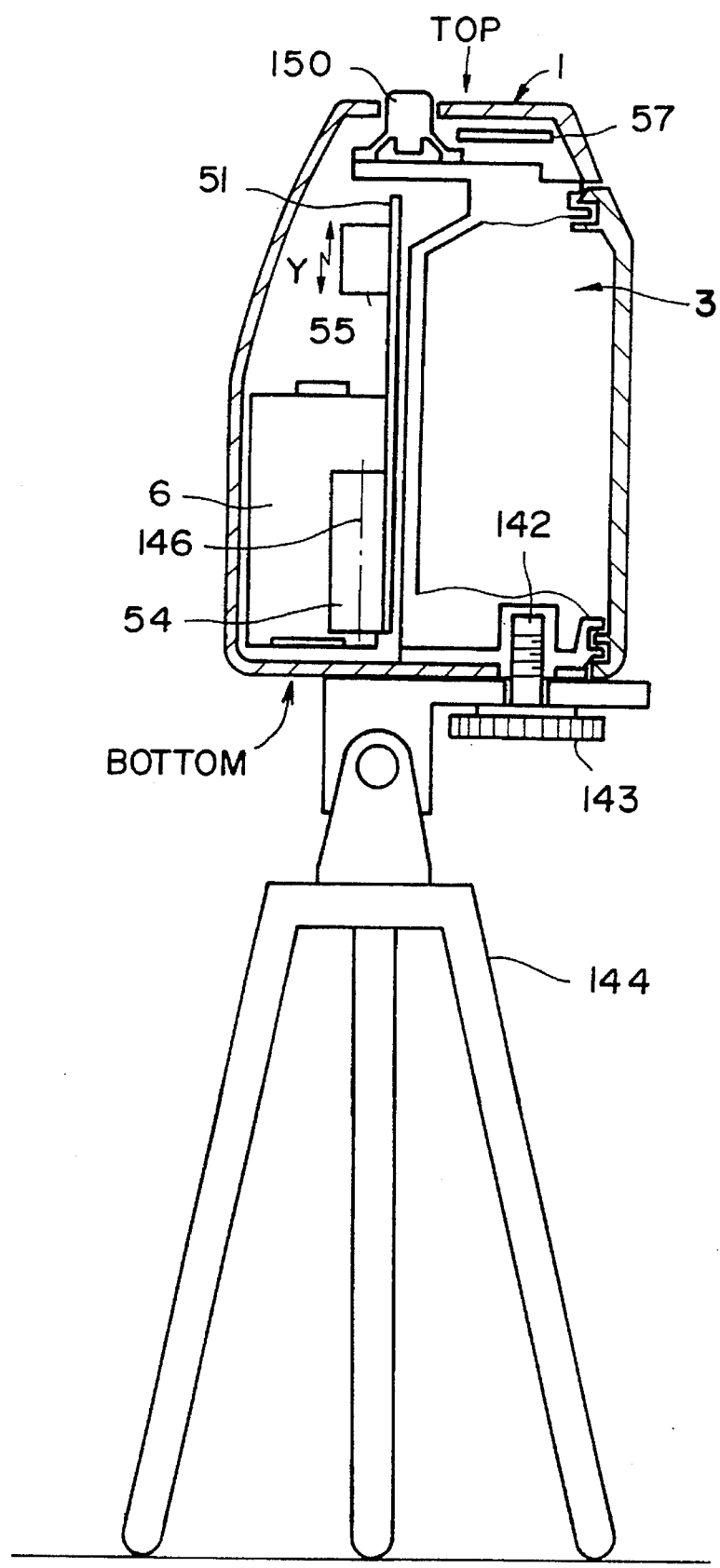
FIG. 17 is a side view of a camera on a tripod, according to the fourth embodiment of the present invention.
Figure 18:
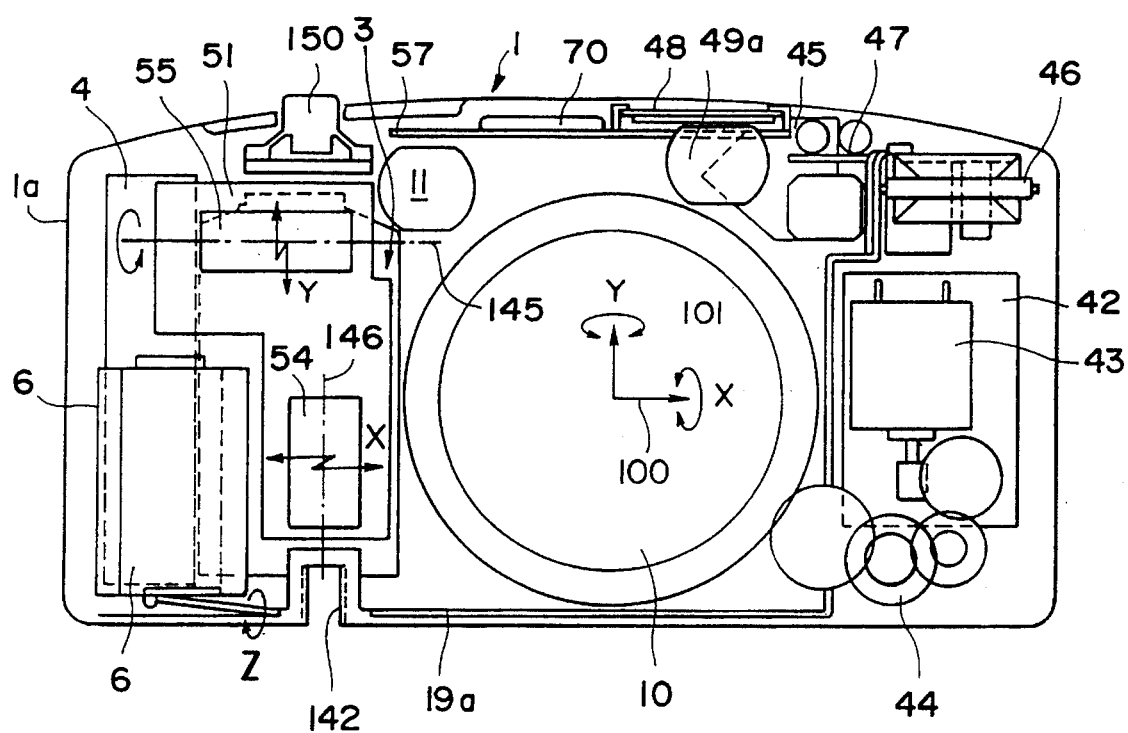
FIG. 18 is a front view showing a camera having a vibration detection function according to the fourth embodiment of the present invention.
Figure 19:
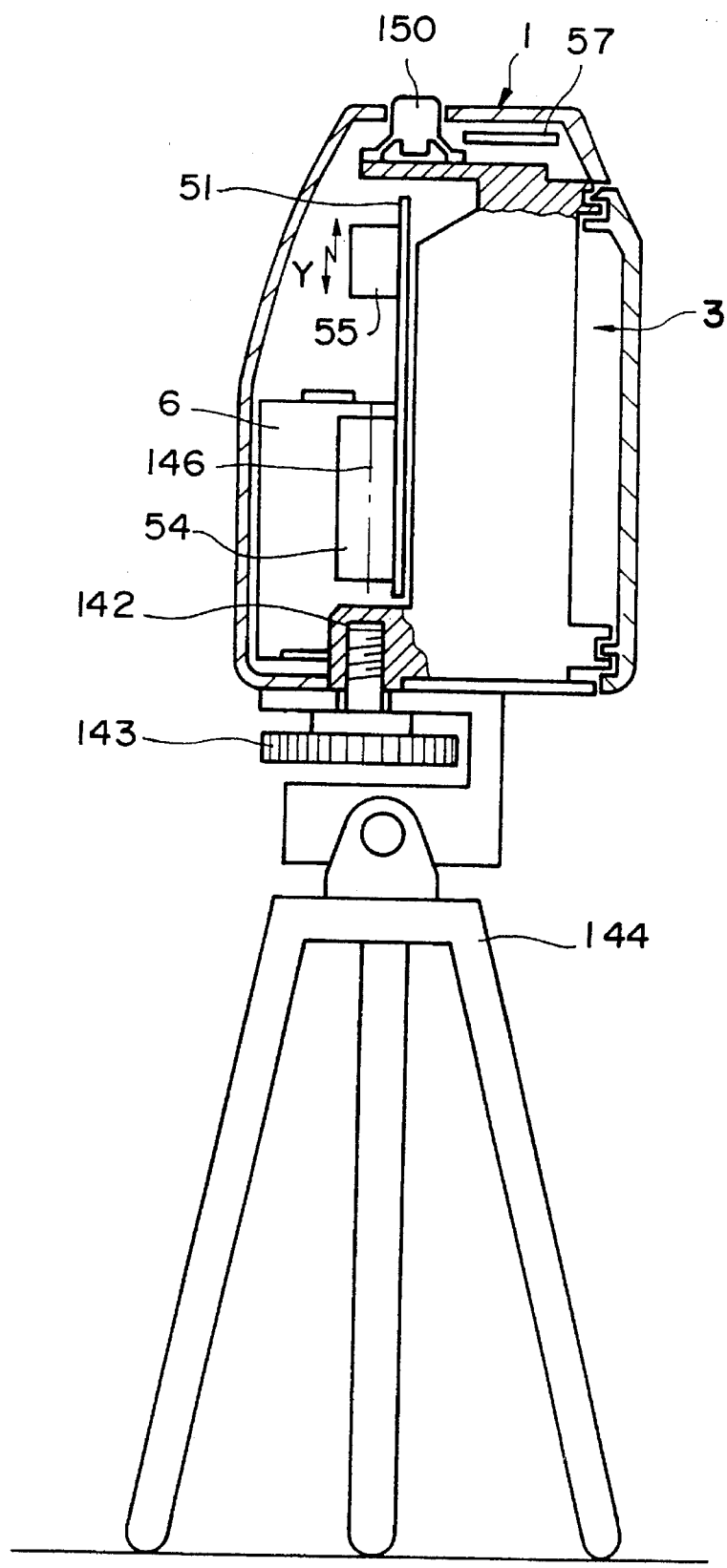
FIG. 19 is a side view of a camera on a tripod according to the fourth embodiment of the present invention.

FIGS. 15–19 illustrate a fourth embodiment of the present invention. FIG. 15 is a front view of a camera according to the fourth embodiment of the present invention. FIG. 16 is a top view of a camera according to the fourth embodiment of the present invention. FIG. 17 is a side view of a camera on a tripod, according to the fourth embodiment of the present invention. FIG. 18 is a front view of a camera having a vibration detection function according to the fourth embodiment of the present invention; and FIG. 19 is a side view of a camera on a tripod according to the fourth embodiment of the present invention.

Photographic lens 10 is positioned in a central portion of camera body 1. Cartridge compartment 3 accommodates a film cartridge and is positioned in the left-hand side of camera body 1, as seen from the subject side. Sensor card 51 and a battery 6 are positioned at the front side of cartridge compartment 3 (see FIG. 17). An additional battery 6 is positioned at the rear side of the first battery 6. Lead wire 19a connects main capacitor 4 and strobe circuit unit 47 (see FIGS. 15 and 17) and is wired in a bottom space portion of camera body 1. This bottom space portion is at a lower portion of sensor card 51. A magnetic field arises in the Z direction (see FIGS. 15 and 17) in the space around lead wire 19a at the time of strobe operation. However, it is important that anti-vibration sensors 54 and 55 are not affected by this magnetic field. Therefore, anti-vibration sensor 54, which detects vibration in the yaw direction 100 (X axis direction), is installed transverse to batteries 6 at the upper portion of lead wire 19a so that anti-vibration sensor 53 is not affected by the Z direction magnetic field. Similarly, anti-vibration sensor 54, which detects the vibration amount of the yaw direction 101 (Y axis direction), is installed in the upper side space of battery 6 and anti-vibration sensor 54. In this manner, the limited space inside camera body 1 is efficiently utilized.

Shutter release button 150 performs ON, OFF operation of the shutter switch (not illustrated) jointly with starting the vibration detection by anti-vibration sensors 54 and 55. As illustrated in FIG. 17, a tripod fixing set screw 143 can be screwed into a tripod fixing set screw hole 142 to fix camera body 1 on the upper end portion of a tripod 144.

Axes 145 and 146 represent vibration detection axes of the anti-vibration sensors 55 and 54, respectively. Vibration detection sensors 54 and 55 detect vibration and anti-vibration drive mechanism 22 performs vibration correction based on the detection signals from anti-vibration sensors 54 and 55. When shutter release button 150 is pressed, a start switch jointly starts a shutter release operation and the detection of vibration by anti-vibration sensors 54 and 55. Shutter release button 150 is arranged in the upper portion of the camera. Tripod fixing set screw hole 142 is arranged on the bottom side of camera body 1 and is placed approximately opposite to the direction of the compression force exerted by the pressing of shutter release button 150. Tripod fixing set screw hole 142 and anti-vibration sensors 54 and 55 have a special feature in that they are located more towards grip portion 1a of camera body 1 than towards photographic lens 10.

By fixing the camera to a tripod in the above-described manner while performing time exposures, a cable release and similar remote operating members are not required. As a result, it is possible to perform the shutter release operation by directly operating shutter release button 150. Accordingly, a cable release, as required in the prior art, is unnecessary and the photographer does not have to carry a cable for cable release. In addition, there is no longer a need for connector members on the camera for the use of a cable release or other remote operating members. Thus, in a camera according to the fourth embodiment of the present invention, the camera size and cost are reduced.

Specifically, in a camera according to the fourth embodiment of the present invention, the depression force of shutter release button 150 can be directly received by tripod 144 since tripod fixing set screw hole 142 is arranged on the bottom of camera body 1 and opposite the direction of the depression pressure of shutter release button 150. Therefore, unnecessary vibrations do not arise.

Moreover, in a camera according to the fourth embodiment of the present invention, anti-vibration sensors 54 and 55 are interposed inside the camera between shutter release button 150 and tripod fixing set screw hole 142. Therefore, the rigidity of the portion of the camera maintaining anti-vibration sensors 54 and 55 is increased. This rigidity acts to prevent vibrations. Specifically, it is important for the portion of camera body 1 in which shutter release button 150 and tripod fixing set screw hole 142 are located, to have the greatest rigidity for receiving external forces. On the other hand, a portion of camera body I having this kind of rigidity is not subject to unwanted vibration due to, for example, deformation. Therefore, it is desirable to locate anti-vibration sensors 54 and 55 in this portion of camera body 1.

In a camera according to the fourth embodiment of the present invention, shutter release button 150 is jointly used to start a shutter release operation and to start the detection of vibration by anti-vibration sensors 54 and 55. Thus, by pressing shutter release button 150, the following actions occur: (a) anti-vibration sensors 54 and 55 begin to detect vibrations, and (b) a conventional shutter release operation begins. The direction of a depression force on shutter release button 150 is in a plane which approximately coincides with a plane that includes the center of gravity 200 and is also parallel to a plane formed by vibration detection axes 145 and 146. For example, if vibration detection axes 145 and 146 are each considered to be a straight line, these vibration detection axes 145 and 145 are together contained in a plane which is parallel to the direction of a depression force of shutter release button 150.

Strobe light generator 46 and strobe circuit unit 47 generate a relatively large amount of electrical noise during photographic operation and are located on the right-hand side seen from the front side (subject side) of the camera. Batteries 6 and main capacitor 4 are located in grip portion 1a on the left-hand side of the camera body 1 seen from the front (subject side) of the camera. Furthermore, anti-vibration sensor 55 detects the amount of vibration in the pitch direction (Y) and is located in a space above battery 6, and anti-vibration sensor 54 detects the amount of vibration in the yaw direction (X) and is located in the transverse space of batteries 6. Lead wire 19a generates a magnetic field in the Z direction during operation. Lead wire 19a connects main capacitor 4 and strobe circuit unit 47 by passing through a camera bottom portion which is below sensor card 51. Thus, lead wire 19a is separated from the main sources which generate electrical noise and anti-vibration sensors 54 and 55 can be located in a position in which electrical noise relatively difficult to receive. Moreover, the camera size is reduced.

The fourth embodiment of the present invention is not intended to be limited to the specific construction described above. For example, tripod fixing set screw hole 142 is described above as being located at the bottom of the camera approximately opposite shutter release button 150, and a tripod body 44 is fixed in this manner. However, as illustrated in FIGS. 18 and 19 in a modified fourth embodiment of the present invention, shutter release button 150 can be arranged in the camera upper portion, opposite sensor card 51, and having anti-vibration sensors 54 and 55 positioned directly below. Tripod fixing set screw hole 142 is located directly below and opposite on the camera bottom. Rigidity can be even further improved in this manner.

In a camera according to the fourth embodiment of the present invention, photographic lens 10 represents a lens barrel comprising a plurality of photographic optical systems.

In a camera according to the fourth embodiment of the present invention, the camera receives external forces. Therefore, it is necessary to make the camera body portion which holds the shutter release button and the tripod fixing set screw hole to be the most rigid. Since this portion is made to be relatively rigid, it is well-suited for positioning anti-vibration sensors.

In a camera according to the fourth embodiment of the present invention, shutter release is possible in time exposures by the direct operation of the shutter release button without requiring a remote cable release or other remote operating members.

Moreover, in a camera according to the fourth embodiment of the present invention, a tripod fixing set screw hole is disposed on the camera bottom opposite the depression direction of the shutter release button and the depression force to the shutter release button can be directly received by the tripod. Therefore, it becomes difficult for vibrations to arise.

In a camera according to the fourth embodiment of the present invention, camera body 1 has a top and a bottom (see FIG. 17). A vibration correction mechanism (CPU 53 and anti-vibration sensors 54 and 55) detects vibrations and adjusts the camera to compensate for the detected vibrations. An initiation unit (shutter release button 150) is pushed to begin the detection of vibrations by the vibration correction mechanism and is positioned on the top of camera body 1. The initiation unit experiences a depression force when pressed. Tripod fixing set screw hole 142 is for fixing a tripod to camera body 1 and is positioned on the bottom of camera body 1 in a location which is approximately opposite the position of the initiation unit and positioned to transfer the depression force to a tripod 144 fixed to the camera body.

In a camera according to embodiments of the present invention described herein, a camera is provided in which the camera body has first and second ends separated by a vertical plane at the optical axis. A release button and an anti-vibration sensor are both positioned in the first end of the camera body. A strobe light generator is positioned in the second end of the camera body.

The embodiments of the present invention disclosed herein are not intended to be limited to a compact camera with photographic lens 10. For example, embodiments of the present invention may be applied to single lens reflex ("SLR") cameras.

Although a few preferred embodiments of the present invention have been shown and described, it will be appreciated by those skilled in the art that changes may be made in these embodiments, without departing from the principles and the spirit of the invention, the scope of which is defined in the claims and their equivalents.

What is claimed is:

1. A camera comprising:

a camera body having first and second ends;

a photographic lens which is positioned on the camera body between the first end and the second end;

a battery compartment positioned in the first end of the camera body;

first and second anti-vibration sensors which detect vibrations affecting the camera and are positioned in the first end of the camera body, the first anti-vibration sensor being positioned approximately between the battery compartment and the photographic lens; and a main capacitor which generates an electric flash and is positioned in the first end of the camera body.

2. A camera as in claim 1, further comprising a front cover which combines with the camera body to enclose the first and second anti-vibration sensors, the battery compartment and the main capacitor, wherein the first anti-vibration sensor extends in a first direction as compared to a second direction which is orthogonal to the first direction, and the second anti-vibration sensor extends in the second direction as compared to the first direction, the second anti-vibration sensor positioned above the battery compartment and between the battery compartment and the front cover.

3. A camera as in claim 2, wherein the first direction represents a vertical direction of the camera and the second direction represents a horizontal direction of the camera.

4. A camera as in claim 2, wherein the first anti-vibration sensor is an angular acceleration detection sensor which detects vibrations in the yaw direction of the camera, and the second anti-vibration sensor is an angular acceleration detection sensor which detects vibrations in the pitch direction of the camera.

5. A camera as in claim 1, further comprising a sensor card on which both the first and second anti-vibration sensors are mounted, wherein the first end of the camera forms a grip portion and the battery compartment, main capacitor and first and second anti-vibration sensors are positioned inside the grip portion.

* * * * *

UNITED STATES PATENT AND TRADEMARK OFFICE
CERTIFICATE OF CORRECTION

PATENT NO. : 5,557,357
DATED : September 17, 1996
INVENTOR(S) : Isao Soshi et al.

It is certified that error appears in the above-indentified patent and that said Letters Patent is hereby corrected as shown below:

On the title page:

Item

[75] - Inventors need to be deleted:

Tatsuo Amanuma
       Jirou Asami
       Yoshio Imura

Item

[57] - In the Abstract, line 23, delete [bosom] and insert --bottom--.

Signed and Sealed this

Eighteenth Day of March, 1997

Attest:

BRUCE LEHMAN

*Attesting Officer*     Commissioner of Patents and Trademarks